United States Patent [19]

Shigeyasu et al.

[11] 3,887,612

[45] June 3, 1975

[54] PROCESS FOR PREPARING HIGH PURITY TEREPHTHALIC ACID

[75] Inventors: Motoo Shigeyasu; Kenzo Kuihara, Ehime, both of Japan

[73] Assignees: Maruzen Oil Co., Ltd.; Matsuyama Petrochemicals Inc., Osaka, both of Japan

[22] Filed: Apr. 26, 1972

[21] Appl. No.: 247,711

[30] Foreign Application Priority Data
Apr. 26, 1971 Japan.................................. 46-27359

[52] U.S. Cl............................ 260/524 R; 260/525
[51] Int. Cl............................................. C07c 63/26
[58] Field of Search................................. 260/524 R

[56] References Cited
UNITED STATES PATENTS

| | | | |
|---|---|---|---|
| 3,064,044 | 11/1962 | Baldwin............................. | 260/524 |
| 3,170,768 | 2/1965 | Baldwin............................. | 260/524 |
| 3,210,416 | 10/1965 | Fragen et al.................... | 260/524 R |

FOREIGN PATENTS OR APPLICATIONS

| | | | |
|---|---|---|---|
| 1,597,677 | 6/1970 | France............................. | 260/535 P |
| 706,916 | 3/1965 | Canada............................. | 260/524 |

*Primary Examiner*—Lorraine A. Weinberger
*Assistant Examiner*—Paul J. Killos
*Attorney, Agent, or Firm*—Sughrue, Rothwell, Mion, Zinn and Macpeak

[57] ABSTRACT

A process for preparing terephthalic acid of high purity which comprises oxidizing para-xylene in the liquid phase with molecular oxygen or a gas containing molecular oxygen in the presence of a lower aliphatic carboxylic acid as a solvent and an oxidation catalyst, subjecting the resultant oxidation reaction product to solid-liquid separation, feeding the resultant terephthalic acid into a slurrying tank, adding a fresh supply of solvent and slurrying the terephthalic acid there, stirring the resulting slurry by continuously withdrawing a part of it from the slurrying tank and returning it into the slurry portion in said tank through a circulating pump located outside the tank and subsequently feeding the slurry into a immersion tank to immerse it at elevated temperatures, followed by solid-liquid separation.

25 Claims, 1 Drawing Figure

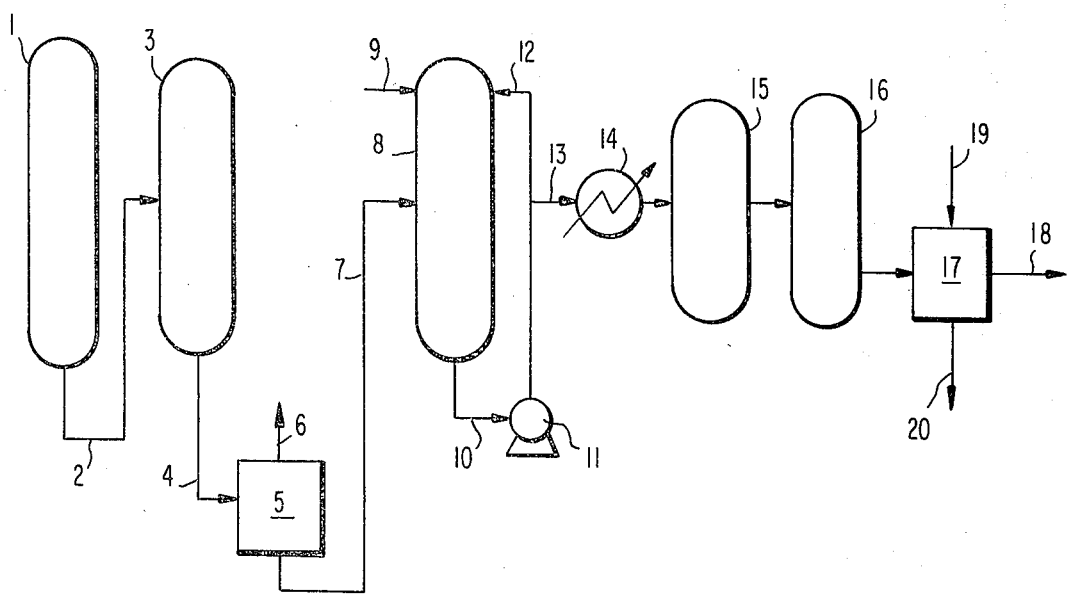

PROCESS FOR PREPARING HIGH PURITY TEREPHTHALIC ACID

BACKGROUND OF THE INVENTION

1. Field of the Invention

This invention relates to a process for preparing terephthalic acid of high purity, and more specifically to a process for preparing terephthalic acid of high purity by subjecting terephthalic acid obtained by the liquid phase oxidation reaction of para-xylene to a specific purifying procedure consisting of a pump stirring treatment and an immersion washing treatment of said terephthalic acid in the form of slurry.

2. Description of the Prior Art

It has been a wide commercial practice to produce terephthalic acid by oxidizing an alkylated aromatic hydrocarbon such as para-xylene in the liquid phase with molecular oxygen at an elevated temperature and pressure in the presence of a solvent such as acetic acid and a heavy metalcontaining oxidation catalyst. The resulting terephthalic acid, however, contains side-reaction products or reaction intermediates such as 4-carboxylbenzaldehyde or para-toluic acid, and it has been impossible to obtain a product of high purity.

Polyethylene terephthalte is produced from terephthalic acid by a circuitous method comprising first converting terephthalic acid to its dimethyl ester, and then after purification, subjecting dimethyl terephthalate to ester-interchange reaction with a glycol, followed by polycondensation. Recently, this method has been superseded by a so-called direct polymerization method in which terephthalic acid is directly reacted with a glycol, and accordingly, terephthalic acid of very high purity has been required.

Various proposals have therefore been made to purify terephthalic acid obtained by the liquid-phase oxidation reaction. Examples of the generally known methods are a method wherein terephthalic acid is recrystallized with a variety of solvents such as water, acetic acid or propionic acid at a high temperature and pressure, a method wherein terephthalic acid is dissolved in water at a high temperature and pressure and hydrogenated with hydrogen gas, and a method wherein terephthalic acid is dissolved in an aqueous alkali solution, and treated with an oxidation agent such as potassium permanganate or hydrogen peroxide. The recrystallizing method, however, has the economical and operational disadvantage that it requires a large quantity of solvent, and the mixture of terephthalic acid and the solvent should be treated at an elevated temperature and pressure. The hydrogenating method requires that the reaction system should be maintained at an elevated temperature and pressure. Furthermore, the hydrogenation reaction must be carried out in a complicated way using a hydrogenation catalyst, and this inevitably results in the complication of the process and a rise in the cost of production. And the oxidizing method wherein terephthalic acid is treated in an aqueous solution has not only the economical and operational disadvantage that it requires a process for recovering terephthalic acid by adding inorganic acid to the aqueous alkaline solution of terephthalic acid and a process for recovering alkali metals, but also the defect that an alkali metal, a harmful substance, cannot be prevented from remaining in the final product.

Accordingly, none of these purification methods has proved satisfactory in respect of operation and economy. To date, there has been reported no commercially feasible method of purifying terephthalic acid to a high degree by an economical and simple operation.

SUMMARY OF THE INVENTION

We have performed extensive research and development work on a method of obtaining high purity terephthalic acid from crude terephthalic acid which is prepared by oxidizing para-xylene in the liquid phase with molecular oxygen in the presence of a heavy metal-containing oxidation catalyst and a lower aliphatic carboxylic acid solvent. As a result, it has been found that impurities contained in terephthalic acid can be efficiently removed and high purity terephthalic acid is obtained by subjecting the liquid-phase oxidation reaction product to solid-liquid separation, feeding the resulting terephthalic acid into a slurrying tank, adding a fresh supply of solvent to slurry the terephthalic acid, and stirring the slurry in the slurrying tank by circulating the slurry through a circulating pump outside the slurrying tank to reduce the particle size of the terephthalic acid as the result of wear away of surface portions of the particles, thereafter feeding the slurry into an immersion tank, and immersing the slurry therein at an elevated temperature while maintaining the solvent in the liquid state. This purifying procedure is economical, and can be performed by a simplified operation.

Accordingly, an object of this invention is to provide an economical and simple process for purifying crude terephthalic acid obtained by the liquid phase oxidation of para-xylene to give highly purified terephthalic acid.

Another object of this invention is to provide a process for producing high purity terephthalic acid suitable for use as the starting material of so-called direct polymerization method by which fiber-grade polyesters of high quality are prepared by direct reaction thereof with ethylene glycol or ethylene oxide.

Many other objects of this invention together with its advantages will become apparent from the following detailed description.

BRIEF DESCRIPTION OF THE DRAWING

FIG. 1 is a simplified flowsheet illustrating one embodiment of the process of this invention.

DETAILED DESCRIPTION OF THE INVENTION

According to this invention, there is provided a process for producing terephthalic acid of high purity which comprises the steps of:

a. oxidizing para-xylene in the liquid phase with molecular oxygen or a gas containing molecular oxygen in the presence of a lower aliphatic carboxylic acid as a solvent and an oxidation catalyst, subjecting the resulting product to solid-liquid separation, and recovering crude terephthalic acid;

b. feeding the crude terephthalic acid into a slurrying tank and slurrying it by addition of a fresh solvent;

c. stirring the resulting slurry by continuously withdrawing a part of it from the slurrying tank and returning it into the slurry portion in said tank through a circulating pump located outside the slurrying tank thereby to reduce the particle size of the terephthalic acid; and d. subsequently feeding the slurry into an immersion tank, immersing the slurry therein at an elevated temperature while maintaining the solvent in the liquid state, and thereafter subjecting it to solid-liquid separation.

By the simple and economical procedure comprising the above steps (a) to (d), impurities such as 4-carboxybenzaldehyde are effectively removed, and terephthalic acid of high purity can be obtained.

It is known that terephthalic acid is a substance having strong adsorbing properties. We have found that side-reaction products and reaction intermediates such as 4-carboxybenzaldehyde or para-toluic acid formed during the oxidation reaction step adhere to the crystals of terephthalic acid, and most of them are present in a portion relatively near the surface. According to the process of this invention, the surface portions of the terephthalic acid crystals in which most of the impurities are present undergo moderate stirring in the presence of a pure solvent newly added, and the surface portions are worn away by mutual contact of the crystals to increase the exposed surface areas wherein most of impurities are contained. Therefore, it is supposed that the impurities present in the crystals are exposed to the new surfaces of the crystals, and by the subsequent immersion treatment, they can be easily removed.

The crude terephthalic acid to be purified by the process of this invention is terephthalic acid obtained by the liquid phase oxidation of dialkylbenzenes such as para-xylene and having a relatively large particle diameter, i.e., an average particle diameter of at least 50 microns. Terephthalic acid obtained industrially by the Henkel process, i.e., the thermal rearrangement of potassium benzoate or phthalate is in the form of finely divided particles having a size of about several microns, and cannot be turned into a slurry of good fluidity when mixed with a solvent. Therefore, this terephthalic acid cannot be efficiently purified by the process of this invention.

The crude terephthalic acid to be purified by the present invention is produced by conventional liquid phase oxidation reaction methods. The preferred reaction conditions of the liquid-phase oxidation are as follows:

The suitable reaction temperature is 80° to 250°C, preferably 130° to 200°C. Since the reaction is carried out in the liquid phase, the pressure must be elevated in order to maintain para-xylene and solvent in the liquid state. The preferred pressure is from 2 to 30 Kg/cm$^2$ gauge. The reaction time or the average residence time of the reactants in the oxidation reactor is from 0.5 to 6 hours, preferably 1 to 3 hours.

The solvent used is a lower aliphatic carboxylic acid such as acetic acid, propionic acid or butyric acid, acetic acid being especially preferred. The amount of the solvent to be used is at least two times the weight of the starting para-xylene, but the preferred amount is three to six times the weight of the para-xylene.

Molecular oxygen or a gas containing molecular oxygen is used as an oxidizing agent. The oxygen-containing gas has an oxygen concentration of at least 7 percent by volume, and the use of air is most advantageous. The suitable amount of oxygen is 3 to 500 mols, preferably 5 to 300 mols, per mol of para-xylene.

Examples of the catalysts are compounds containing a heavy metal such as cobalt or manganese and compounds containing bromine, The preferred heavy metal compounds include, for example, cobalt or manganese salts of inorganic acids, naphthenic acid or lower fatty acids. Examples of the bromine compounds that can be used are hydrogen bromide, cobalt bromide, sodium bromide, potassium bromide, free bromine, and organic bromine compounds such as tetrabromoethane or $\alpha,\alpha,\alpha',\alpha'$-tetrabromopara-xylene. Reaction promoters such as ketones or aldehydes can also be used, if desired.

The reaction mixture obtained by the liquid-phase oxidation reaction is withdrawn from the reactor, and subjected to solid-liquid separation using a separator such as a decanter or centrifugal separator.

Crude terephthalic acid thus obtained is separated from the reaction mother liquor and fed into a slurrying tank, where it is mixed with a fresh solvent and turned into a slurry. The slurry is continuously circulated through a circulating pump outside the slurrying tank at a constant flow rate, and then returned to the slurry within the slurrying tank. This procedure gives an agitating energy to the slurry present in the slurrying tank, and the slurry is thus subjected to the so-called pump agitation treatment. While the terephthalic acid is present in the reaction mother liquor, it is maintained in the form of large size particles to minimize the adsorption of the impurities present in the mother liquor onto the terephthalic acid. On the other hand, when the terephthalic acid particles are separated from the mother liquor and immersed with a fresh solvent, the surface portion of the terephthalic acid wherein most impurities are contained is worn away and the thus exposed areas contacting with the solvent increase so as to facilitate the removal of the impurities adhering to the terephthalic acid crystals. Accordingly, the pump stirring treatment and immersion treatment of the slurry of the terephthalic acid need to be carried out after mixing the terephthalic acid with a fresh pure solvent. If the slurry of terephthalic acid withdrawn from the oxidation reactor is directly subjected to the pump stirring treatment without exchanging the reaction mother liquor for a fresh solvent, the terephthalic acid particles having a larger surface area as a result of wear away of the surface portions come into contact with the mother liquor containing various impurities formed during the oxidation reaction. Therefore, the terephthalic acid particles adsorb the impurities, and even if such terephthalic acid particles are subsequently immersed with a fresh solvent, terephthalic acid of high purity intended by the present invention cannot be obtained.

Examples of the solvent that is put in the slurrying tank to prepare a slurry of terephthalic acid include lower aliphatic carboxylic acids such as acetic acid, propionic acid or butyric acid, water, cellosolves, methyl ethyl ketone, alcohols, dioxane, benzene, toluene, or xylene. The use of the lower aliphatic carboxylic acid the same as that used in the oxidation reaction is especially advantageous because the solvent used for the slurrying and immersion treatment can be recovered and recycled to the oxidation reaction. The amount of the solvent should be at least sufficient for turning the terephthalic acid particles into a slurry having fluidity suited for pump transportation. In order to increase the purifying effect in the immersion treatment step after pump stirring, larger amounts of the solvent are preferred. Too much solvent, however, is economically disadvantageous since the impurity-removing effect is not increased with an increase in the amount of the solvent. In addition, the concentration of the slurry is reduced and the reduction of the particle size of the terephthalic acid cannot be performed with ease by the pump stirring treatment, which results in the need for longer periods of time employed for the pump stirring treatment. Accordingly, the amount of the solvent may be determined properly by considering these factors. Generally, the suitable amount is one to about 10 times the weight of the terephthalic acid.

The so-called pump stirring method in which a solid-liquid mixture is stirred by placing the mixture in a slurrying tank, passing the mixture through a circulating pump located outside the tank continuously at a constant flow rate, and then returning it continuously to the slurrying tank, thereby to give a stirring energy to the mixture present in the tank, has been widely used for mixing and agitating a slurry or the like. The pump stirring treatment in the present invention, however, is not intended merely for the complete mixing of a solid-liquid mixture. The purpose of the pump stirring process in the present invention is to give a moderately strong stirring action to the terephthalic acid particles to bring them into contact with each other and thereby to wear away the surface portions of the terephthalic acid particles to which most of the impurities adhere. It is necessary in the present invention that the pump stirring treatment should be carried out to an extent such that the average particle size of the terephthalic acid particles will be reduced by 10 to 30 percent. Another stirring treatment, for example, stirring using a stirrer having ordinary stirring vanes, requires prolonged periods of time of achieving the stirring effect intended by the present invention even if the rotating speed of the stirrer is rendered extremely fast. Therefore, it is not suitable for use in the present invention. On the other hand, if the crystals of terephthalic acid are pulverized using a ball mill, hammer mill or the like, they are divided excessively, and the size of the crystals becomes extremely small. Therefore, when these crystals are mixed with a solvent to make a slurry, the resulting slurry has a reduced fluidity and this makes the handling thereof troublesome, as even the central portion of particles containing few impurities are pulverized into such a small size that they are contaminated with impurities.

Accordingly, it is necessary to control properly the strength of the pump stirring treatment, i.e., the amount of the slurry circulated by the pump per unit time to the total amount of the slurry, and the stirring time. Even if the strength of the stirring treatment is increased more than necessary or the stirring time is made longer than necessary to reduce the average particle size of the terephthalic acid particles by more than 30 percent, there is hardly any appreciable increase in purifying effect in the subsequent immersion treatment. Rather, the purifying effect decreases as the particle size decreases excessively because even the portion containing few impurities is worn away. If, on the contrary, the average particle size reduction does not reach 10 percent, the surface portions of the terephthalic acid crystals are not sufficiently worn away, and the removal of the impurities in the subsequent immersion treatment is not performed sufficiently. Thus, a satisfactory purifying effect cannot be obtained.

The time required for the pump stirring of the slurry and the amount of the slurry circulated by the pump per unit time to the total amount of the slurry vary according to such factors as the concentration of the slurry (the ratio between the terephthalic acid particles and the solvent), the quality of crude terephthalic acid, or the quality of the purified terephthalic acid as a final product, and cannot be determined monistically. Usually, however, these conditions are selected such that the slurry will be circulated one to 100 times through the circulating pump, in accordance with the following equation.

$$\frac{[\text{pump capacity (m}^3/\text{hr})] \times [\text{treating time or average residence time (hr)}]}{\text{Amount of slurry in the slurrying tank (m}^3)} = 1 \sim 100$$

The slurrying tank includes an inlet for crude terephthalic acid and the solvent, a slurry discharge outlet at the bottom, and a pipe for introducing the circulating slurry into the slurry present in the tank. The slurry withdrawn from the discharge outlet passes through the circulating pump outside the tank, and is returned to the slurry in the tank via the pipe. When the terephthalic acid crystals in the slurrying tank settle, the smooth pump stirring of the slurry is prevented. This is outstanding especially when the stirring force is not so great, that is, when the ratio of the pump capacity to the total amount of the slurry in the slurrying tank is small. In order to obviate this difficulty, it is preferred to provide a stirrer within the slurrying tank, by which stirrer the slurry is constantly agitated so as not to cause the sedimentation of the terephthalic acid crystals. The pump stirring of the slurry is performed at room temperature, and it is not necessary to heat or cool it. The pump stirring treatment can be carried out in either continuous operation or batchwise.

The slurry of the terephthalic acid particles having a reduced average particle size as a result of the pump stirring treatment described above is then fed to an immersion tank. The slurry of the terephthalic acid particles whose surface portions have been worn away by the moderate stirring force in the previous pump stirring treatment is heated in the immersion tank, and subjected to the immersion treatment while maintaining the solvent in the liquid state. This treatment makes it possible to remove the impurities adhering to the terephthalic acid crystals with good efficiency, and terephthalic acid of high purity can be obtained. The temperature employed in the immersion treatment is at least 50°C, preferably 130° to 180°C. When the treatment is performed at a temperature above the boiling point of the solvent used, the pressure must be elevated in order to maintain the solvent in the liquid state. The time required to complete the immersion treatment or the average residence time of the slurry in the slurrying tank is at least 10 minutes. Preferably, the treatment is carried out for 30 to 180 minutes. The employment of longer periods of time beyond 180 minutes is hardly beneficial since the purifying effect does not appreciably increase with increasing immersion time after passage of 180 minutes. The immersion tank is provided with a stirrer and a heating device. A reflux condenser is also provided when the immersion treatment is carried out at an elevated pressure at a temperature above the boiling point of the solvent.

According to the process of this invention described above, a slurry of terephthalic acid particles having impurities formed during the oxidation reaction, such as 4-carboxybenzaldehyde or para-toluic acid, adhering thereto undergoes a moderately vigorous stirring action by the pump stirring treatment, and the surface portions are moderately worn away to increase the exposed surface area of the surface portion containing much impurities. In the subsequent immersion treatment, the impurities are efficiently removed. Accordingly, the present invention has made it possible to obtain terephthalic acid of high purity with simplicity and ease. The process of this invention proves especially effective when applied to the production of high purity terephthalic acid which is suitable as a material of the direct polymerization method wherein polyethylene terephthalate is prepared by direct reaction of terephthalic acid with a glycol.

Previously, we investigated oxidizing activity of a cobaltmanganese-bromine catalyst in the liquid-phase oxidation of para-xylene, and found that high purity terephthalic acid not obtainable by the conventional oxidation method can be prepared by performing the liquid-phase oxidation in the presence of a catalyst of a specific composition (containing 0.05 to 0.50 percent by weight, based on the solvent used, of a cobalt compound and 1 to 20 percent by weight, based on the cobalt compound, of a manganese compound, the percentages being calculated as the respective metals), and that such terephthalic acid has a 4-carboxybenzaldehyde content of less than 400 ppm. This new discovery was already applied for a patent under Japanese Patent Application No. 96334/70. If the purifying treatment of this invention is applied to terephthalic acid of reduced 4-carboxybenzaldehyde content which is obtained by the oxidation reaction using this improved catalyst, terephthalic acid having a quality required as a material for an especially white polyester for fibers or special films can be obtained. Such terephthalic acid has an extremely high purity as indicated by its 4-carboxybenzaldehyde content of 60 ppm or less.

Now, one embodiment of this invention will be described by referring to FIG. 1.

The oxidation reaction product obtained by the liquid-phase oxidation of para-xylene in an oxidation reactor 1 is withdrawn from a pipe 2, and fed into a crystallizer 3. The crystallizer is equipped with a reflux condenser and a stirrer. Usually, the crystallization is performed using two or more crystallizers. The reaction product mixture containing the crystals of terephthalic acid is then fed into a solid-liquid separator 5 (such as a centrifugal separator or filter) via a pipe 4, in which separator the mixture is subjected to solid-liquid separation. The reaction mother liquor is withdrawn from a pipe 6 and it is transferred to the recovery section of the solvent. In the meantime, the terephthalic acid crystals are withdrawn from a pipe 7, and placed in a slurrying tank 8, where they are mixed with a predetermined amount of a solvent introduced from a pipe 9. The resulting solid-liquid mixture is withdrawn from a pipe 10 at a constant flow rate, and passed through a circulating pump 11. The slurry which has passed through said pump is returned to the slurry within the tank 8 through a pipe 12, whereby the slurry is agitated. The slurry containing terephthalic acid particles of an average particle size reduced to a desired degree as a result of the pump stirring treatment performed for a predetermined period of time is fed through a pipe 13 into a heat-exchanger 14, and pre-heated there. The pre-heated slurry is then fed into an immersion tank 15, where it is subjected to the immersion treatment at an elevated temperature and, if desired, at an elevated pressure. The slurry containing purified terephthalic acid as a result of the immersion treatment is stored in a reservoir 16, and then fed into a solid-liquid separator 17. The solution part separated is recovered via a pipe 18. On the other hand, the terephthalic acid crystals are washed within the separator 17 with acetic acid, water, etc., introduced from a pipe 19, and withdrawn therefrom through a pipe 20. The crystals are then dried to form purified terephthalic acid as a final product.

According to the process of the present invention described above in detail, high purity terephthalic acid of small contents of impurities such as 4-carboxybenzaldehyde can be obtained by a simple and economical procedure comprising subjecting terephthalic acid particles obtained by the liquid phase oxidation of paraxylene, in the form of a slurry, to the pump stirring treatment to reduce the particle size of the terephthalic acid, and thereafter immersing the slurry in a solvent under relatively mild conditions. Therefore, the process of this invention is advantageous both industrially and economically in that terephthalic acid of extremely high purity can be obtained without the defects of the conventional purifying methods, for example, without going through a complicated purifying process as in the hydrogenating purifying method or without the need for severe high temperature and pressure conditions as in the re-crystallizing method.

The process of this invention will now be illustrated by the following Examples and Comparative Examples. It should be understood that these Examples will in no way limit the scope of the present invention.

EXAMPLE 1

A titanium-lined pressure reactor (inner capacity 40 liters) equipped with a reflux condenser, a stirrer, a heating device, a material feed inlet, a gas feed inlet and a product discharge outlet was charged with 12 Kg of acetic acid, 81.2 g of cobalt bromide hexahydrate and 2.7 g of manganese acetate tetrahydrate (0.17 percent by weight of cobalt metal based on the acetic acid, and 3.0 percent by weight of manganese metal based on the cobalt metal), and 1 Kg/ hr of para-xylene and 4.2 liters/g para-xylene of air were introduced thereinto for 2 hours at a temperature of 200°C and a pressure of 24 Kg/cm² gauge. After completion of the reaction, the reaction product was withdrawn and subjected to solid-liquid separation. The solid portion was washed with acetic acid to form 3 Kg (yield 96 percent) of terephthalic acid having an average particle size of 200 microns. The properties of the terephthalic acid were as follows:

| | |
|---|---|
| Content of 4-carboxybenzaldehyde | 90 ppm |
| Molecular extinction coefficient ($\epsilon 380$ m$\mu$)* | less than 0.01 |
| Color difference, b value ** | −0.2 |

This terephthalic acid (3 Kg) and 9 Kg of acetic acid were fed into a 20-liter slurrying tank equipped with a stirrer and a pump circulating line to stir a slurry. The slurry was passed through a circulating pump having a capacity of 15 liters/hr, and circulated for 3 hours to subject it to the stirring treatment. The treated terephthalic acid had an average particle size of 150 microns. The slurry was then fed into a titanium-lined immersion tank (inner capacity 40 liters) equipped with a reflux condenser, a stirrer and a heating device, and immersed therein for 60 minutes at a temperature of 150°C and a pressure of 10 Kg/cm$^2$ gauge. Then, the slurry was withdrawn from the immersion tank, and subjected to solid-liquid separation. The terephthalic acid separated was washed with acetic acid, and dried. The properties of the resulting terephthalic acid were as follows:

| | |
|---|---|
| Content of 4-carboxybenzaldehyde | 30 ppm |
| Molecular extinction coefficient ($\epsilon$380 m$\mu$) | less than 0.01 |
| Color difference, b value | −0.5 |

*5 g of the terephthalic acid was dissolved in 100 ml of 2N aqueous ammonia, and the absorption of the terephthalic acid at 380 m$\mu$ was measured using a spectrophotometer. Smaller values mean better colors.
**The color difference is the exterior color of terephthalic acid (solid) determined by measuring the reflected light of the terephthalic acid by a color-difference meter (Model CM-20) of Color Machine Co., Ltd. The b value shows yellow (+) to blue (−), and smaller values mean better colors.

EXAMPLE 2

The procedure of Example 1 was repeated except that para-xylene was introduced at a rate of 2 Kg/hr (twice the rate used in Example 1) for 90 minutes. There was obtained 4.5 Kg (yield 96%) of crude terephthalic acid having an average particle size of 200 microns. The properties of the crude terephthalic acid were as follows:

| | |
|---|---|
| Content of 4-carboxybenzaldehyde | 160 ppm |
| Molecular extinction coefficient ($\epsilon$380 m$\mu$) | less than 0.01 |
| Color difference, b value | −0.1 |

9 Kg of acetic acid was added to 3 Kg of the crude terephthalic acid thus obtained, and the resulting slurry was subjected to the pump stirring and immersion treatments in the same way as set forth in Example 1. The resulting terephthalic acid had the following properties.

| | |
|---|---|
| Content of 4-carboxybenzaldehyde | 60 ppm |
| Molecular extinction coefficient ($\epsilon$380 m$\mu$) | less than 0.01 |
| Color difference, b value | −0.4 |

EXAMPLE 3

3 Kg of terephthalic acid prepared by the same oxiation process as set forth in Example 2 and 9 Kg of acetic acid was mixed. The said mixture was subjected to the pump stirring and immersion treatment in the same way as set forth in Example 2 except that the pump stirring treatment was performed for 1.5 hours. The treated tereththalic acid had an average particle size of 170 microns, and had the following properties.

| | |
|---|---|
| Content of 4-carboxybenzaldehyde | 70 ppm |
| Molecular extinction coefficient ($\epsilon$380 m$\mu$) | less than 0.01 |
| Color difference, b value | −0.4 |

EXAMPLE 4

The liquid-phase oxidation of para-xylene was performed in the same way as set forth in Example 2 except that 23.9 g of cobalt bromide (hexahydrate) and 62.8 g of manganese bromide (tetrahydrate) (0.05 percent by weight of cobalt metal based on the acetic acid, and manganese metal in an amount of two times the weight of the cobalt metal) were used as a catalyst. There was obtained 4.2 Kg (yield 90 percent) of terephthalic acid having an average particle size of 200 microns. The resulting crude terephthalic acid had the following properties.

| | |
|---|---|
| Content of 4-carboxybenzaldehyde | 800 ppm |
| Molecular extinction coefficient ($\epsilon$380 m$\mu$) | 0.06 |
| Color difference, b value | +5.0 |

9 Kg of acetic acid was added to 3 Kg of the crude terephthalic acid obtained above, and the resulting slurry was then subjected to the pump stirring and immersion treatments in the same way as set forth in Example 2. The terephthalic acid obtained has the following properties.

| | |
|---|---|
| Content of 4-carboxybenzaldehyde | 400 ppm |
| Molecular extinction coefficient ($\epsilon$380 m$\mu$) | 0.04 |
| Color difference, b value | +3.0 |

COMPARATIVE EXAMPLE 1

The procedure of Example 2 was repeated except that the slurry was directly charged into the immersion tank without treating in the slurrying tank. The resulting terephthalic acid had the following properties.

| | |
|---|---|
| Content of 4-carboxybenzaldehyde | 120 ppm |
| Molecular extinction coefficient ($\epsilon$380 m$\mu$) | less than 0.01 |
| Color difference, b value | −0.2 |

COMPARATIVE EXAMPLE 2

The procedure of Example 2 was repeated except that the slurry was subjected to the pump stirring treatment in the slurrying tank for 30 minutes to reduce the average particle size of terephthalic acid to 190 microns (5 percent reduction). The resulting terephthalic acid had the following properties.

| | |
|---|---|
| Content of 4-carboxybenzaldehyde | 110 ppm |
| Molecular extinction coefficient ($\epsilon$380 m$\mu$) | less than 0.01 |
| Color difference, b value | −0.2 |

COMPARATIVE EXAMPLE 3

The procedure of Example 2 was repeated except that the slurry was subjected to the pump stirring treatment in the slurrying tank for 30 hours to reduce the average particle size of terephthalic acid to 80 microns (60 percent reduction). The terephthalic acid obtained had the following properties.

| | |
|---|---|
| Content of 4-carboxybenzaldehyde | 100 ppm |
| Molecular extinction coefficient ($\epsilon$380 m$\mu$) | less than 0.01 |
| Color difference, b value | −0.3 |

COMPARATIVE EXAMPLE 4

After completion of the oxidation reaction in the same way as set forth in Example 2, the reaction mixture was directly fed into the slurrying tank without separating the reaction mother liquor therefrom, and subjected to the pump stirring treatment to reduce the average particle size of the terephthalic acid to 150 microns. Thereafter, the mixture was subjected to solid-liquid separation. The solid portion was fed into the immersion tank together with 9 Kg of acetic acid, and the slurry was subjected to the immersion treatment in the same way as set forth in Example 2. The resulting terephthalic acid had the following properties.

| | |
|---|---|
| Content of 4-carboxybenzaldehyde | 100 ppm |
| Molecular extinction coefficient ($\epsilon 380\ m\mu$) | less than 0.01 |
| Color difference, b value | −0.2 |

It will be clearly seen from the foregoing Examples and Comparative Examples that the superior purifying effect contemplated by the present invention could not be sufficiently attained when the terephthalic acid crystals were subjected to the immersion treatment without treating them in the slurrying tank (i.e., without reducing the particle size of the terephthalic acid crystals) (Comparative Example 1), when the pump stirring treatment was insufficient (Comparative Example 2), when the pump stirring treatment was excessive (Comparative Example 3), or when crude terephthalic acid was subjected to the pump stirring treatment without separating it from the reaction mother liquor (Comparative Example 4).

What is claimed is:

1. A process for producing terephthalic acid of high purity which comprises the steps of:
   a. oxidizing para-xylene in the liquid phase with molecular oxygen or a gas containing molecular oxygen in the presence of a lower aliphatic carboxylic acid as a solvent and an oxidation catalyst, and subjecting the resulting product which comprises crude terephthalic acid particles in a mother liquor comprising unreacted components and reaction by-products of the reaction to a solid-liquid separation, thereby separating crude terephthalic acid particles from said mother liquor;
   b. feeding the crude terephthalic acid particles into a slurrying tank and slurrying it by addition of fresh solvent;
   c. stirring the resulting slurry by continuously withdrawing a part of it from the slurrying tank and returning it into the slurry portion in said slurrying tank through a circulating pump located outside the slurrying tank to thereby reduce the average particle size of the terephthalic acid by crystal/crystal contact during said stirring; and
   d. subsequently feeding the slurry into an immersion tank, immersing the slurry therein at an elevated temperature while maintaining the solvent in the liquid state, and thereafter subjecting it to solid-liquid separation to form purified terephthalic acid.

2. The process of claim 1, wherein said lower aliphatic carboxylic acid used for the liquid-phase oxidation is acetic acid.

3. The process of claim 1, wherein the amount of the solvent used in the liquid-phase oxidation is two to six times the weight of the paraxylene.

4. The process of claim 1, wherein said oxidation catalyst used in the liquid-phase oxidation comprises cobalt, manganese and bromine.

5. The process of claim 1, wherein air is used as the gas containing molecular oxygen.

6. The process of claim 1, wherein the liquid-phase oxidation of para-xylene is carried out at a temperature of 80° to 250°C and a pressure of 2 to 30 Kg/cm² gauge.

7. The process of claim 1, wherein the liquid phase oxidation of para-xylene is carried out at a temperature of 130° to 200°C and a pressure of 2 to 30 Kg/cm² gauge.

8. The process of claim 1, wherein the reaction time or the average residence time of the reactants in the oxidation reactor is 0.5 to 6 hours.

9. The process of claim 1, wherein the reaction time or the average residence time of the reactants in the oxidation reactor is 1 to 3 hours.

10. The process of claim 1, wherein crude terephthalic acid obtained by the liquid-phase oxidation of para-xylene with molecular oxygen or a gas containing molecular oxygen using an oxidation catalyst containing a cobalt compound, a manganese compound and a bromine compound, the amount of the cobalt metal being 0.05 to 0.50 percent by weight of the solvent and the amount of the manganese metal being 1 to 20 percent by weight based on the cobalt metal, is subjected to said pump stirring treatment and immersion treatment, to thereby form highly purified terephthalic acid having a 4-carboxybenzaldehyde content of 60 ppm or less.

11. The process of claim 1, wherein said solvent for slurrying the crude terephthalic acid is acetic acid.

12. The process of claim 1, wherein the amount of said solvent for slurrying the crude terephthalic acid is one to 10 times the weight of the crude terephthalic acid.

13. The process of claim 1, wherein the average particle size of the terephthalic acid particles is reduced by 10 to 30 percent as a result of the pump stirring treatment.

14. The process of claim 1, wherein said immersion treatment is carried out at a temperature of at least 50°C.

15. The process of claim 1, wherein said immersion treatment is carried out at a temperature of 130° to 180°C.

16. The process of claim 1, wherein the treating time or the average residence time for said immersion treatment is at least 10 minutes.

17. The process of claim 1, wherein the treating time or the average residence time for said immersion treatment is 30 to 180 minutes.

18. The process of claim 1 wherein:
   the crude terephthalic acid particles are slurried with 1 to 10 times the weight of the crude terephthalic acid particles of solvent;
   the average particle size of the crude terephthalic acid particles is reduced by 10 to 30 percent as a result of the pump stirring treatment;
   the immersion treatment of step (d) is carried out at a temperature of at least 50°C. for at least 10 minutes.

19. The process of claim 1 wherein the average particle size of the crude terephthalic acid particles is at least 50 microns.

20. The process of claim 1 where the solvent for the oxidation and the solvent used for the slurrying of step (b) are identical.

21. The process of claim 1 wherein the pump stirring of step (c) is at room temperature.

22. The process of claim 1 wherein the pump stirring of step (c) is such that the slurry will be circulated from one to 100 times through the circulating pump in accordance with the following equation:

$$\frac{[\text{pump capacity (m}^3/\text{hr})] \times [\text{treating time or average residence time (hr)}]}{\text{Amount of slurry in the slurrying tank (m}^3)} = 1-100$$

23. The process of claim 1 wherein the crude terephthalic acid particles which are slurried in step (b) contain impurities most of which adhere to the surface portions of the terephthalic acid particles, which surface portions are worn away during said pump circulating of step (c), which reduces the average particle size of said terephthalic acid particles so that impurities adhering to the terephthalic acid particles are subsequently removed with good efficiency in said immersion treatment of step (d).

24. The process of claim 1 wherein the solvent of step (b) is fresh, pure solvent.

25. The process of claim 18 wherein the average particle size of the crude terephthalic acid particles is at least 50 microns.

* * * * *